Aug. 2, 1938.   E. M. KRUEGER   2,125,380
WATER METER MOUNTING
Filed Feb. 27, 1937   2 Sheets-Sheet 1

INVENTOR
Emil M. Krueger
BY Wheeler, Wheeler and Wheeler
ATTORNEYS

Aug. 2, 1938.  E. M. KRUEGER  2,125,380
WATER METER MOUNTING
Filed Feb. 27, 1937  2 Sheets-Sheet 2
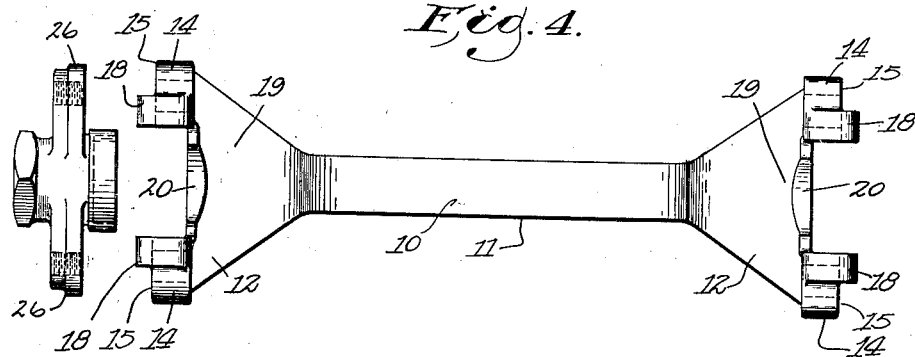
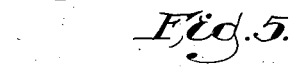
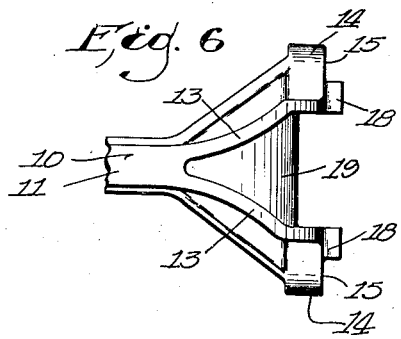
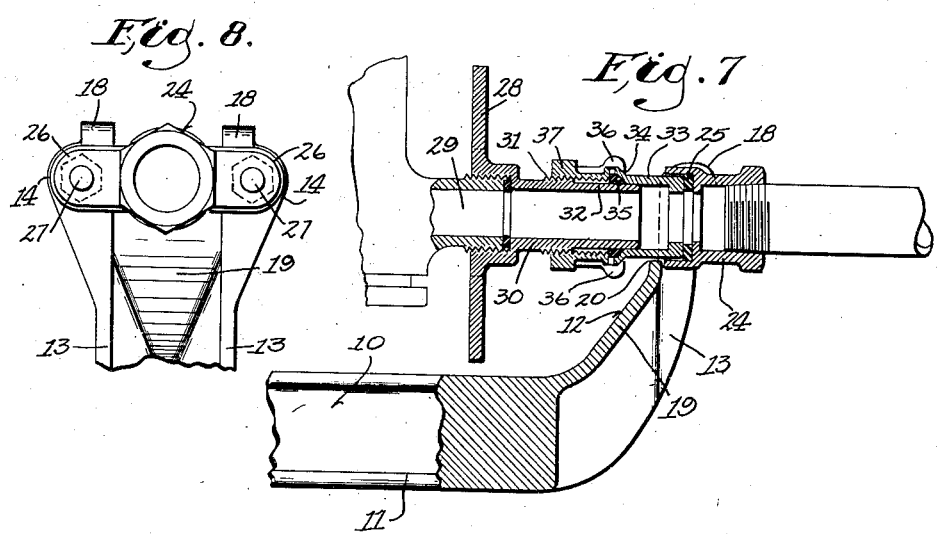
INVENTOR
Emil M. Krueger
BY
Wheeler, Wheeler and Wheeler
ATTORNEYS Patented Aug. 2, 1938

2,125,380

UNITED STATES PATENT OFFICE 2,125,380

WATER METER MOUNTING

Emil M. Krueger, Milwaukee, Wis., assignor to Badger Meter Manufacturing Company, Milwaukee, Wis., a corporation of Wisconsin Application February 27, 1937, Serial No. 128,134

9 Claims. (Cl. 285—3)

This invention relates to improvements in water meter mountings.

It is the object of the invention to provide a meter yoke and associated fittings providing a readily detachable but rigid tension connection in which a meter is freely receivable, the nature of the yoke and fittings being such that they may be assembled without springing the pipes and with great facility attributable to the fact that the yoke and fittings interlock in a supporting relation to maintain the parts in alignment pending their connection.

Other objects will be apparent from the disclosure of the invention.

In the drawings:

Figure 4 is an enlarged plan view showing the meter yoke and one of its correlated fittings spaced in position for assembly.

Figure 5 is a detail view in end elevation of the meter yoke.

Figure 6 is a fragmentary bottom plan view of an end portion of the yoke.

Figure 7 is an enlarged fragmentary detail view partially in side elevation but largely in section through an end portion of the yoke and its associated fittings.

Figure 8 is a fragmentary detail view in end elevation showing in assembled relation the fitting and yoke illustrated in Figure 4.

Like parts are identified by the same reference characters throughout the several views.

Figure 1:
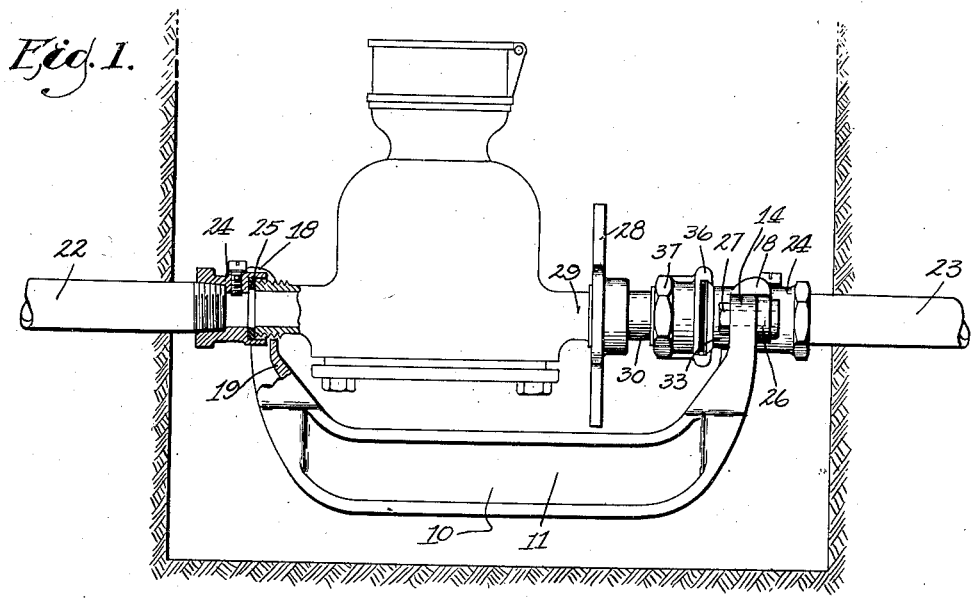
Figure 1 is a view largely in side elevation and partially in section showing a meter mounting embodying the invention.

It has long been a preferred practice in meter installation to provide a yoke affording physical connection between the ends of the pipes between which the meter is mounted to resist tension strains, such pipes having fittings for connection with the yoke and adapted to co-operate with other fittings secured to the meter and expansible so that the meter is held in compression between the two ends of the yoke and the pipe fittings associated therewith.

The present invention contemplates a new coaction between the yoke and its associated fittings to the end that although the yoke may be positioned without springing or distorting the pipes with which it is to be connected, it is nevertheless interlockingly engaged with such pipes to receive support therefrom pending its rigid connection therewith.

Accordingly my improved yoke 10 comprises a rigid bar 11 having channeled terminal portions 12 providing divergent webs 13 flanged at 14 to provide oppositely projecting ears which are faced at 15 to constitute clamping surfaces. Each of these ears 14 is pierced by a bolt hole 16, and from each projects a lug 18 overhanging the bearing surface 15.

The divergent webs 13 are integrally connected by a transverse web 19, the upper surface of which is concavely notched to provide a saddle 20 between the lugs 18. The two ends of the yoke are identical.

Special fittings coact with the ends of the yoke. Some of these fittings are designed as special pipe connections to receive pipes from any ordinary angle. A few are illustrated in the drawings by way of exemplification of the invention. Thus in Fig. 1 the pipes 22 and 23 are in alignment. Secured to the end of each is a fitting 24 internally threaded at one end like a pipe coupling to engage the pipe and socketed at the other end to receive a gasket 25. A detail of this fitting in plan is shown in Fig. 4 on an enlarged scale, and it will be observed that projecting laterally from its sides are ears 26 apertured and tapped to receive bolts such as that shown at 27 in Fig. 1, passing through the holes 16 of the flanges 14 of the yoke.

The plumber who sets the pipes 22 and 23 will supply an end of each pipe with one of the pipe fittings 24, leaving the ears 26 horizontal. The meter man will thereupon be able to position the yoke 10 by simply inserting the yoke between the two fittings 24, where it will be supported by engagement of its lugs 18 with the wings or ears 26 of the respective fittings. It will remain thus supported in absolute alignment with the pipes until the cap screws or bolts 27 are inserted through the holes in the yoke into the tapped apertures of the fitting to rigidly connect the yoke to each fitting and thereby rigidly to connect, through the yoke, the two pipes 22 and 23.

The meter is supplied with an expansion fitting which is preferably, though not necessarily, of the special form shown in the drawings. The meter spud is inserted into the socketed end of one of the pipe fittings 24 in engagement with the gasket 25. Thereupon the expansion fitting at the other end of the meter will rest upon the saddle 20 of the corresponding end of the yoke pending the expansion of the expansion fitting to engage the gasket of the other pipe fitting 24, thus establishing a watertight connection between the pipes 22 and 23 through the meter.

The preferred form of expansion fitting is shown in detail in Fig. 7. The hand lever 28 may be used to mount on the meter spud 29 an extension pipe 30 providing a screw threaded portion at 31 and a bearing portion at 32. The sleeve 33 is telescopically expansible upon the bearing portion 32 and its end portion engages with the gasket 25 in the socketed terminal of the pipe fitting 24. A conically formed flange 34 on the inner end of the extension sleeve 33 receives packing at 35 in its interior and is externally engaged by the fingers 36 of a nut 37 which operates on the threaded portion 31 of the extension pipe of the meter. The end of nut 37 engages the packing. Thus, by rotating nut 37 it is possible either to exert thrust through the packing upon sleeve 33 in a direction to extend the sleeve or, if the nut be turned in the opposite direction, its fingers 36 will retract the extension sleeve 33. The fact that the pressure employed to extend the sleeve is transmitted through the packing 35 assures the compression of this packing to prevent leakage.

Figure 2:
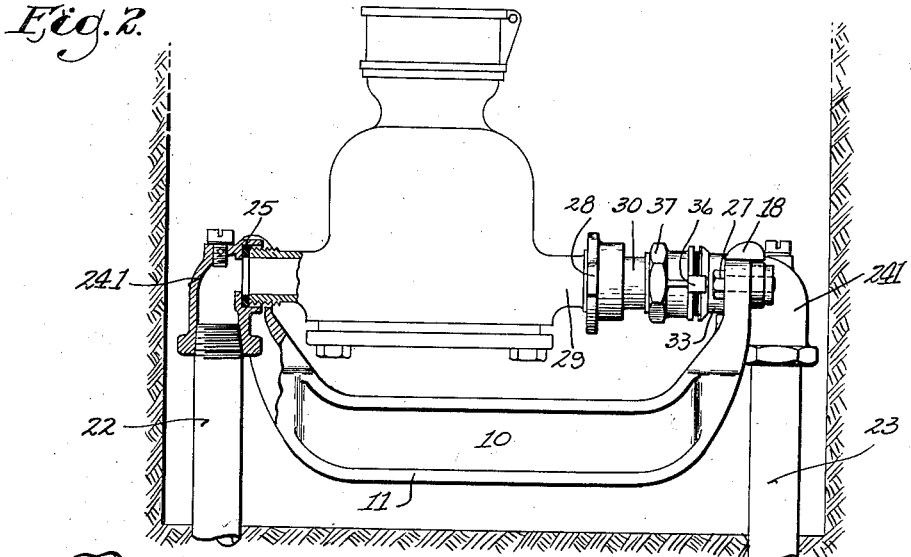
Figure 2 is a similar view showing a slightly modified organization of the parts.
Figure 3:
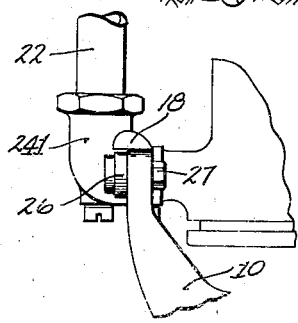
Figure 3 is a fragmentary detail view in side elevation showing a further modification of the structure shown in Figure 2.

The other special pipe fittings, whether they include valves or elbows, are of similar construction in that each provides the laterally projecting ears at 26 which support the lugs 18 of the yoke and each provides a socketed terminal portion to receive the gasket 25. In Fig. 2 I have shown elbowed fittings 241 for use where the pipes 22 and 23 rise vertically from the bottom of the meter pit. In Fig. 3 I have shown the elbow fitting 241 inverted as required where the pipe 22 extends downwardly to the meter. One of my objects in illustrating the inversion of the elbow fitting is to indicate the fact that the lugs 18 of the yoke 10 are engageable either with the upper surface or the lower surface of the ears 26 with which the several fittings are provided, it being understood that the upper and lower surfaces of these ears are preferably symmetrical with reference to the tapped openings therein which receive the cap screws or bolts 27.

From the foregoing description it will be apparent that in the use of my improved yoke and associated fittings for the mounting of meters it is never necessary to spring or distort the pipes or plumbing in order to provide for the temporary support of the yoke until its bolts can be secured. In all of the various constructions the yoke simply drops into place between the pipe fittings with which it is to be connected, and in every instance the lugs of the yoke will be supported by the ears of the pipe fittings until the parts can be bolted together. This is of great advantage when working in confined quarters, as in a small meter pit materially below the level of the surrounding earth or floor.

Not only does the yoke coact with the pipe fittings preferably employed therewith, but it also coacts with the meter fittings to provide temporary support for the meter and expander pending the extension of the expander sleeve into clamping engagement with the pipe fittings and the intervening gaskets. This naturally develops considerable compression and subjects the yoke to a very substantial degree of tension, but the particular yoke construction herein disclosed is peculiarly adapted to withstand this pressure without yielding. This is also an important feature since any yielding of the yoke would throw the parts out of alignment. The construction of my improved yoke and its associated fittings is such as to provide means for ensuring the absolute alignment of the gasketed sockets into which the meter and its extension sleeve are received.

I claim:

1. The combination with a pipe fitting provided with projecting ears having bearing surfaces on their forward faces, said pipe fitting providing a packed socket intermediate said ears and projecting therebeyond, of a yoke having spaced bearing surfaces complementary to those of said ears and between which the projecting socket portion of said pipe fitting is receivable, the spaced portions of said yoke having lugs overhanging the bearing surfaces of said yoke and engageable marginally with said ears, and means in threaded connection with said ears for clamping the spaced portions of said yoke thereto.

2. In a device of the character described, a yoke comprising a bar having upstanding members at its ends in mutually spaced relation, web portions integrally connecting said members with said bar, said web portions being mutually divergent, a third web portion integrally connecting said first mentioned web portions, and lugs projecting from said upstanding members above the level of said bar, said members providing apertured bearing surfaces immediately below said lugs, and said lugs extending beyond said surfaces in a direction substantially longitudinally of the bar.

3. In a device of the character described, the combination with a pipe fitting, including a coupling member and bearing elements disposed at each side of the coupling member and spaced behind said coupling member, of a yoke having a body portion and a pair of terminal elements spaced from each other and projecting longitudinally from said body portion to provide a clear opening therebetween of sufficient dimensions to permit the free passage of said coupling member between said last mentioned elements, and means for connecting the elements of the pipe fittings with those of the yoke while exposing said coupling member between the yoke elements.

4. In a device of the character described, a yoke comprising a bar, integral flanges divergent laterally and extending forwardly from one end of the bar, an integral web connecting said flanges and providing a saddle, and a pair of bearing elements constituting faced lateral and forward extensions from said flanges, said bearing elements being spaced to receive a pipe coupling and said saddle being adapted to support a companion coupling for alignment therewith.

5. In a device of the character described, a yoke comprising a body portion bifurcated at its ends to provide laterally spaced and longitudinally extending attaching elements, a pipe coupling having complementary laterally spaced attaching elements and an intervening coupling portion projecting beyond its said elements and adapted to be received between the elements of the yoke and to move freely in one direction therebetween, means carried by certain of said elements engageable with the others of said elements for limiting relative movement between the pipe coupling and the yoke in one direction, whereby to provide temporary support for the yoke with the coupling member between the yoke elements, and means constituting a part of said yoke providing a saddle behind the yoke elements for sustaining a coupling device in registry with said coupling member, and mechanism for the permanent connection of the elements of the coupling and yoke.

6. In a device of the character described, a yoke provided with means for supporting its ends upon spaced couplings, said yoke comprising a bar having upturned ends and bifurcated at least at one of said ends to comprise terminal parts spaced laterally from each other and projecting both upwardly and longitudinally from said bar to provide a coupling-receiving slot between said parts, whereby the said end of said yoke may be lowered freely over a contiguous coupling to expose said coupling between said parts, said supporting means being connected with said parts.

7. In a device of the character described, a meter yoke comprising a terminal having a hooked portion bifurcated for free engagement over a meter coupling to receive support therefrom while exposing said coupling to receive a connection, and having a bar portion extending from said terminal in offset relation thereto and provided with a second terminal having means for engagement with another coupling, and having a saddle portion opening upwardly to receive a meter and to support it from, and in substantial alignment with, the respective couplings.

8. In a device of the character described, the combination with a pair of spaced fittings comprising meter coupling members, of a yoke having an offset body and terminal members provided with openings aligned substantially longitudinally of said body and in which said coupling members are exposed for connection of a meter therebetween, at least one of said openings comprising a slot also opening laterally and into which the associated coupling member may be inserted laterally, and stop means carried by certain of said members for limiting relative movement between the terminal members and the coupling members in a lateral direction, whereby to support the yoke from the coupling members.

9. In a device of the character described, the combination with a pair of spaced fittings comprising meter coupling members, of a yoke provided with an offset body and longitudinally extending bifurcated hook means for detachably slidable connection with said fittings and between which said coupling members are exposed, saddle webs on the body and disposed between said hook means at each end of the body below and between the exposed coupling members and means for securing each end of said yoke to its associated fitting.

EMIL M. KRUEGER.